(12) United States Patent
Yu

(10) Patent No.: US 11,734,212 B2
(45) Date of Patent: Aug. 22, 2023

(54) BUS INTERCONNECTION SYSTEM AND METHOD FOR DETECTING BAD ROUTING BY THE SAME

(71) Applicant: REALTEK SEMICONDUCTOR CORP., Hsinchu (TW)

(72) Inventor: Yung-Hui Yu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 27 days.

(21) Appl. No.: 17/524,931

(22) Filed: Nov. 12, 2021

(65) Prior Publication Data

US 2022/0405224 A1 Dec. 22, 2022

(30) Foreign Application Priority Data

Jun. 17, 2021 (TW) .................................. 110122005

(51) Int. Cl.
*G06F 13/40* (2006.01)
*H04L 45/16* (2022.01)
*H04L 45/00* (2022.01)

(52) U.S. Cl.
CPC .......... *G06F 13/4022* (2013.01); *H04L 45/16* (2013.01); *H04L 45/22* (2013.01)

(58) Field of Classification Search
None
See application file for complete search history.

(56) References Cited

U.S. PATENT DOCUMENTS

| 8,737,269 B1* | 5/2014 | Zhou ....................... H04L 41/12 370/255 |
| 2012/0170575 A1* | 7/2012 | Mehra ................. H04L 45/7453 370/359 |

FOREIGN PATENT DOCUMENTS

CN 112187644 A 1/2021

* cited by examiner

*Primary Examiner* — Farley Abad
*Assistant Examiner* — Dayton Lewis-Taylor
(74) *Attorney, Agent, or Firm* — Li & Cai Intellectual Property (USA) Office

(57) ABSTRACT

A bus interconnection system and a method for detecting bad routing by the same are provided. The bus interconnection system includes a master node, destination nodes, and a first order switch node. The destination nodes include slave nodes, the bus interconnection system assigns an identification symbol to each of the destination nodes, and adds a destination identification symbol to data sent to the slave nodes by the master node through the first order switch node. When the first order switch node receives the data, the first order switch node updates the destination identification symbol of the data according to a payload of the data, and when one of the destination nodes receives the data, the one of the destination nodes determines whether a bad routing occurs by checking whether the destination identification symbol is equal to the identification symbol assigned to the destination node that receives the data.

14 Claims, 5 Drawing Sheets

BUS INTERCONNECTION SYSTEM AND METHOD FOR DETECTING BAD ROUTING BY THE SAME

CROSS-REFERENCE TO RELATED PATENT APPLICATION

This application claims the benefit of priority to Taiwan Patent Application No. 110122005, filed on Jun. 17, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to detecting bad routing, and more particularly to a bus interconnection system and a method for detecting bad routing by the same.

BACKGROUND OF THE DISCLOSURE

A bus interconnection system includes at least one master node, multiple slave nodes, and at least one switch node coupled between the master node and the slave nodes. The master node sends data to a designated slave node through the switch node, but the switch node may mistakenly send the data to incorrect destination nodes due to a transient fault of a logic unit or a register, a temperature or voltage variation, or component aging. Therefore, the bus interconnection system urgently needs a method for detecting bad routing. Common methods use a hardware redundancy method to copy a circuit into multiple copies and compare outputs of the multiple copies of the circuit to determine whether or not the bad routing occurs.

In view of an erroneous behavior that the switch node sends the data to the incorrect destination node, the hardware redundancy method can copy only circuit modules that cause this kind of erroneous behavior, such as address decoders and channel demultiplexers or the like in the switch node, but additional hardware cost is still high. In addition, other common methods include redundant transmission that can repeatedly send the data without copying the hardware to detect whether or not the bad routing occurs. However, even if the redundant transmission does not cause significant additional hardware costs as the hardware redundancy method, the redundant transmission still causes unnecessary energy waste and performance loss.

SUMMARY OF THE DISCLOSURE

In response to the above-referenced technical inadequacies, one embodiment of the present disclosure provides a bus interconnection system including at least one master node, a plurality of destination nodes, and at least one first order switch node that is coupled between the at least one master node and the plurality of destination nodes. The plurality of destination nodes include a plurality of slave nodes, the bus interconnection system assigns an identification symbol to each of the plurality of destination nodes, and adds a destination identification symbol to data sent to the slave nodes by the at least one master node through the at least one first order switch node. In response to the at least one first order switch node receiving the data, the at least one first order switch node updates the destination identification symbol of the data according to a payload of the data, and in response to one of the plurality of destination nodes receiving the data, the destination node determines whether or not a bad routing occurs by checking whether or not the destination identification symbol of the data is equal to the identification symbol assigned to the destination node that receives the data.

One embodiment of the present disclosure provides a method for detecting bad routing, which is suitable for a bus interconnection system including at least one master node, a plurality of destination nodes, and at least one first order switch node that is coupled between the at least one master node and the plurality of destination nodes. The plurality of destination nodes include a plurality of slave nodes, and the method includes the following steps. Firstly, an identification symbol is assigned to each of the plurality of destination nodes, and a destination identification symbol is added to data sent to the slave nodes by the at least one master node through the at least one first order switch node. Next, in response to the at least one first order switch node receiving the data, the at least one first order switch node updates the destination identification symbol of the data according to a payload of the data, and in response to one of the plurality of destination nodes receiving the data, the destination node determines whether or not a bad routing occurs by checking whether or not the destination identification symbol of the data is equal to the identification symbol assigned to the destination node that receives the data.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
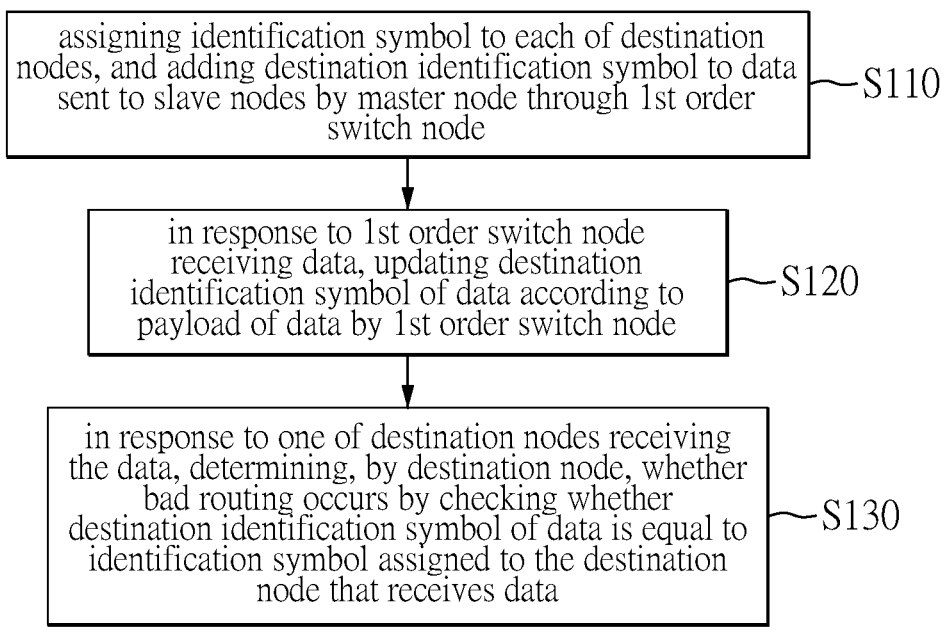
FIG. 1 is a flowchart of a method for detecting a bad routing according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
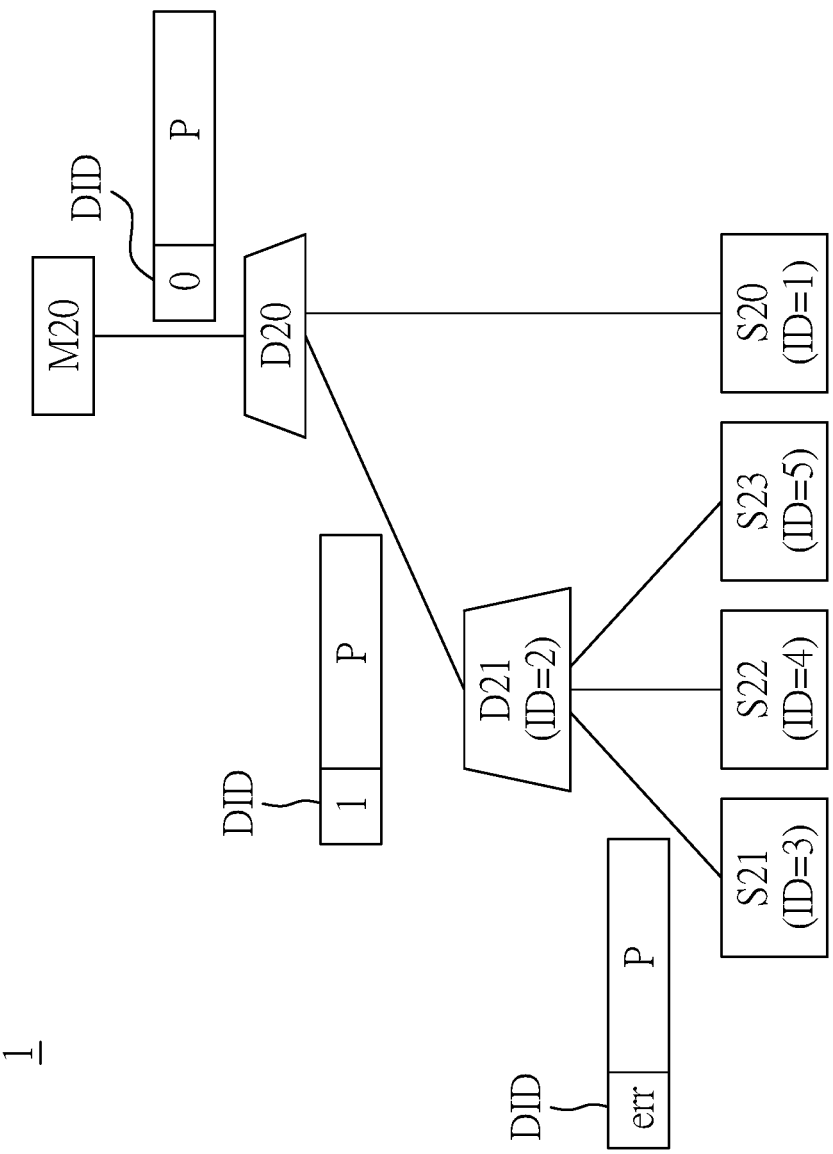
FIG. 2 is a first schematic diagram showing a bus interconnection system using the method of FIG. 1 according to one embodiment of the present disclosure.

Reference is made to FIGS. 1 and 2, FIG. 1 is a flowchart of a method for detecting bad routing provided by one embodiment of the present disclosure, and FIG. 2 is a first schematic diagram showing a bus interconnection system 1 using the method of FIG. 1 according to one embodiment of the present disclosure. As mentioned above, the bus interconnection system can include at least one master node, a plurality of slave nodes, and at least one switch node coupled between the master node and the plurality of slave nodes. However, for the convenience of the following description, the bus interconnection system 1 in FIG. 2 is used as an example by only including one master node, four slave nodes, and two switch nodes. In addition, since a master control node M20 in FIG. 2 can directly send data to a slave node S20 through a switch node D20, send the data to a switch node D21 through the switch node D20, and then send the data to slave nodes S21 to S23 through the switch node D21, the bus interconnection system 1 can define the switch nodes D20 and D21 as the first order switch node and the second order switch node, respectively, and define the switch node D21 and the slave nodes S20 to S23 as destination nodes, but the present disclosure does not limit specific implementations of the bus interconnection system 1. In summary, the bus interconnection system 1 includes at least one master node, a plurality of destination nodes, and at least one first order switch node coupled between the master node and the plurality of destination nodes, and the plurality of destination nodes include a plurality of slave nodes. In some embodiments, the present disclosure does not limit the architecture of the bus interconnection system 1. The bus interconnection system 1 can include multiple master nodes, multiple slave nodes, and multiple switch nodes at multiple levels. The numbers of the master nodes, the slave nodes, and the switch nodes can be determined according to actual needs and suitable for the bus interconnection system of the present disclosure. In addition to the switch nodes mentioned above, the bus interconnection system 1 can further include other nodes with different functions according to actual needs, such as data width conversion nodes and clock domain conversion nodes. Even if the architecture is changed, it is still applicable to the bus interconnection system and the method for detecting bad routing provided by the present disclosure.

As shown in FIG. 2, the bus interconnection system 1 assigns an identification symbol ID to each of the plurality of destination nodes. For example, the slave node S20 can be assigned an identification symbol ID having a number of 1, the switch node D21 can be assigned an identification symbol ID having a number of 2, the slave node S21 can be assigned an identification symbol ID having a number of 3, and so forth. The slave node S23 can be assigned an identification symbol ID having a number of 5, but the present disclosure is not limited thereto. In addition, the bus interconnection system 1 adds a destination identification symbol DID to the data sent by the master control node M20 through the switch node D20 (that is, the first order switch node) to the slave nodes S20 to S23, in which FIG. 2 illustrates that the destination identification symbol DID can be prepended to a payload P of the data, but the present disclosure is not limited thereto. That is, the bus interconnection system 1 can add an unprecedented destination identification symbol DID in addition to a transmission format of the data in compliance with a standard bus protocol, and the master control node M20 can further set the destination identification symbol DID of the data to an initial symbol (for example, a number 0). Then, since the payload P already contains an address of a node to which the data is to be sent, in response to the switch node D20 receiving the data, the switch node D20 updates the destination identification symbol DID of the data according to the payload P of the data, and in response to one of the destination nodes receiving the data, the destination node determines whether or not a bad routing occurs by checking whether or not the destination identification symbol DID of the data is equal to the identification symbol ID assigned to the destination node that receives the data.

In response to the destination identification symbol DID of the data being not equal to the identification symbol ID of the destination node, the destination node determines the bad routing occurs. It should be noted that the address of the node included in the payload P is in a format encoded by an address encoder, and the switch node D20 can not only send the data to the slave node S20, but also send the data to the switch node D21 (i.e., the second order switch node). Therefore, in response to the switch node D20 receiving the data, the switch node D20 decodes the address of the node included in the payload P through the address decoder to decide whether to send the data to the slave node S20 or the switch node D21, and at the same time updates the destination identification code DID of the data to the identification symbol ID of the slave node S20 or the switch node D21. Then, in response to the slave node S20 or the switch node D21 receiving the data, the slave node S20 or the switch node D21 can determine whether or not the bad routing occurs by checking whether or not the destination identification symbol DID of the data is equal to the identification symbol ID assigned to the destination node that receives the data.

In response to the switch node D21 receiving the data and determining that the bad routing does not occur (that is, the destination identification symbol DID at this time is equal to the identification symbol ID of the switch node D21), the switch node D21 then decodes the address of the node included in the payload P through the address decoder to decide whether to send the data to one of the slave nodes S21 to S23, and at the same time updates the destination identification symbol DID of the data to the identification symbol ID of the slave node, that is, the destination identification symbol DID is again updated according to the payload P of the data. Conversely, taking FIG. 2 as an example, in response to the switch node D21 receiving the data and determining that the bad routing occurs (i.e., the destination identification symbol DID at this time is not equal to the identification symbol ID of the switch node D21), the switch node D21 sets the destination identification symbol DID of the data to an error symbol (such as characters "err"), and then sends the data to any one of the slave nodes S21 to S23. Therefore, when any one of the slave nodes S21 to S23 receives the data, since that the destination identification symbol DID is inevitably checked to be not equal to the identification symbol ID assigned to the destination node that receives the data, it is determined that the bad routing occurs. In addition, in response to the slave node as a node at the very end determining that the bad routing occurs, the slave node can send an error detected signal (not shown in FIG. 2) to notify the bus interconnection system 1, or enter a specific protection mode to perform processes such as an error recovery. That is, the present disclosure does not limit processes performed after the slave node determines that the bad routing occurs, and a person skilled in the art should be able to design according to actual needs or applications.

It can be seen that, compared with an existing bus interconnection system, the present disclosure does not need to copy the entire circuit and repeatedly send the data, and the present disclosure is equivalent to designing redundant data to provide the destination node to detect the bad routings. Therefore, the present disclosure reduces hardware cost, avoids unnecessary energy waste and performance loss, and improves reliability and fault tolerance. In addition, the present disclosure can also detect an erroneous behavior that the switch node sends the data to incorrect destination nodes caused due to the failure of address decoders and demultiplexers of the switch node. Therefore, as shown in FIG. 1, in step S110, the bus interconnection system 1 assigns an identification symbol ID to each of the plurality of destination nodes, and adds a destination identification symbol DID to the data sent to the slave nodes by the master node through the at least one first order switch node. It should be noted that, the identification symbol ID assigned to each destination node in step S110 is determined in a circuit design stage, and numbers of the destination nodes are passively determined by a physical circuit. Until subsequent steps are performed, the physical circuit actively detects whether the bad routing occurs. Next, in step S120, in response to the at least one first order switch node receiving the data, the at least one first order switch node updates the destination identification symbol DID of the data according to the payload P of the data, and in step S130, in response to one of the plurality of destination nodes receiving the data, the destination node determines whether or not a bad routing occurs by checking whether or not the destination identification symbol DID of the data is equal to the identification symbol ID assigned to the one of the plurality of destination nodes that receives the data.

Figure 3:
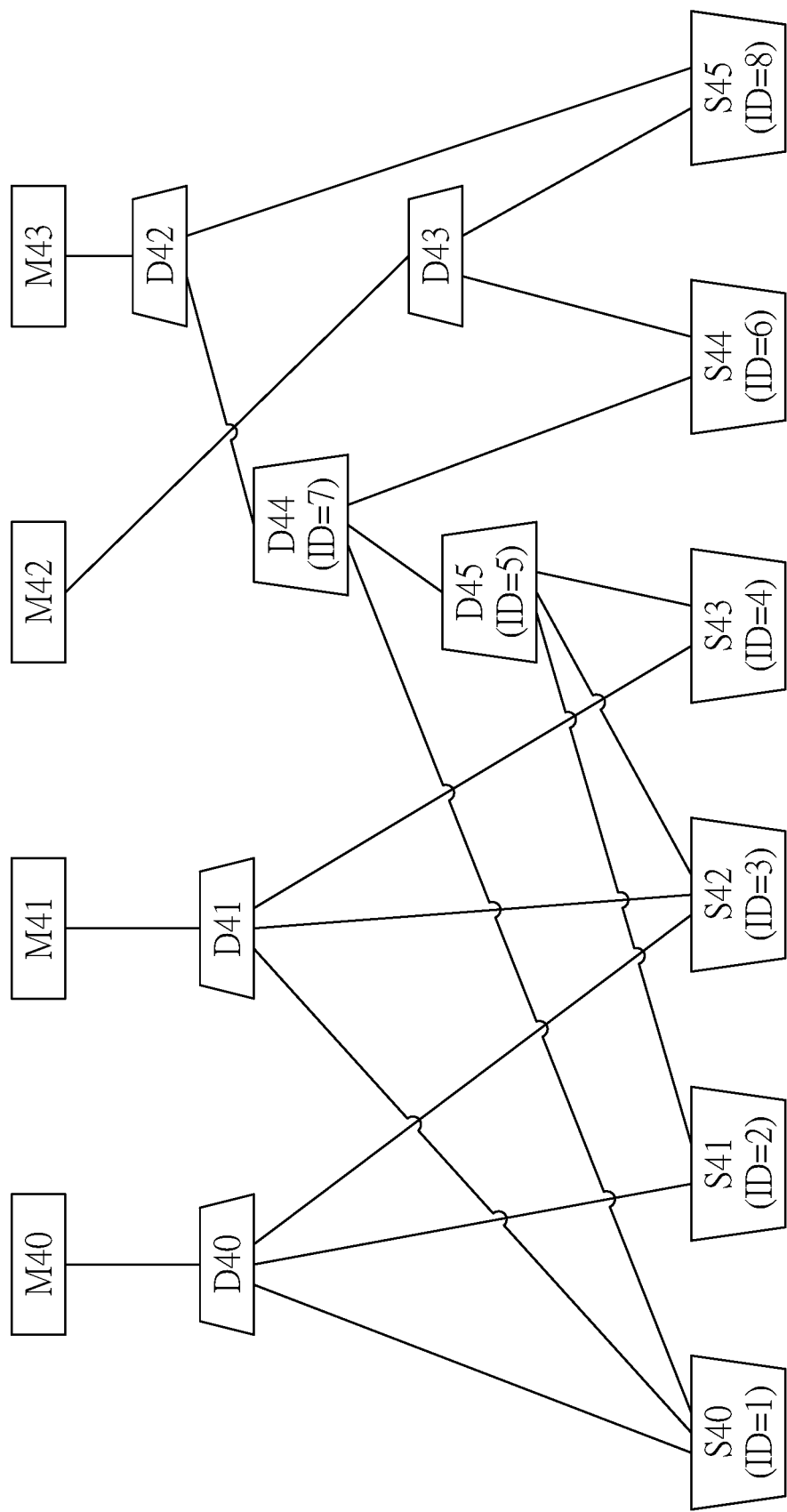
FIG. 3 is a second schematic diagram showing the bus interconnection system using the method of FIG. 1 according to one embodiment of the present disclosure.

On the other hand, the destination identifier DID needs to be used to distinguish different destination nodes, such that the simplest way to assign an identifier symbol ID to each destination nodes is to use a unique identifier. For example, reference is made to FIG. 3. FIG. 3 is a second schematic diagram showing a bus interconnection system using the method of FIG. 1 according to one embodiment of the present disclosure. Taking FIG. 3 as an example, the bus interconnection system 1 is changed to include four master nodes, six slave nodes, and six switch nodes. It should be understood that switch nodes D40 to D43 can all be defined as the first order switch nodes, and switch nodes D44 and D45 can both be defined as the second order switch nodes. In addition, slave nodes S40 to S45 and the switch nodes D44 and D45 are all defined as the destination nodes. Therefore, if unique identification codes are used, the bus interconnection system 1 in FIG. 3 requires 8 different identification symbols ID, such as numbers of 1 to 8, but the present disclosure is not limited thereto. However, an actual bus interconnection will have different architectures and topological relationships for specific purposes, and connections between nodes will be like a tree-shaped network, and since the nodes are sparsely connected, each of the nodes may not be connected to all nodes other than itself. If one of the destination nodes can separate multiple destination node groups by merely considering the destination nodes connected to itself, and as long as uniqueness between a source and a destination of data transmission is shown, the bus interconnection system 1 can reuse the same identification symbol ID, such that the total number of identification symbols required is reduced, and a number of bits required for setting the destination identification symbol DID are also saved.

Figure 4:
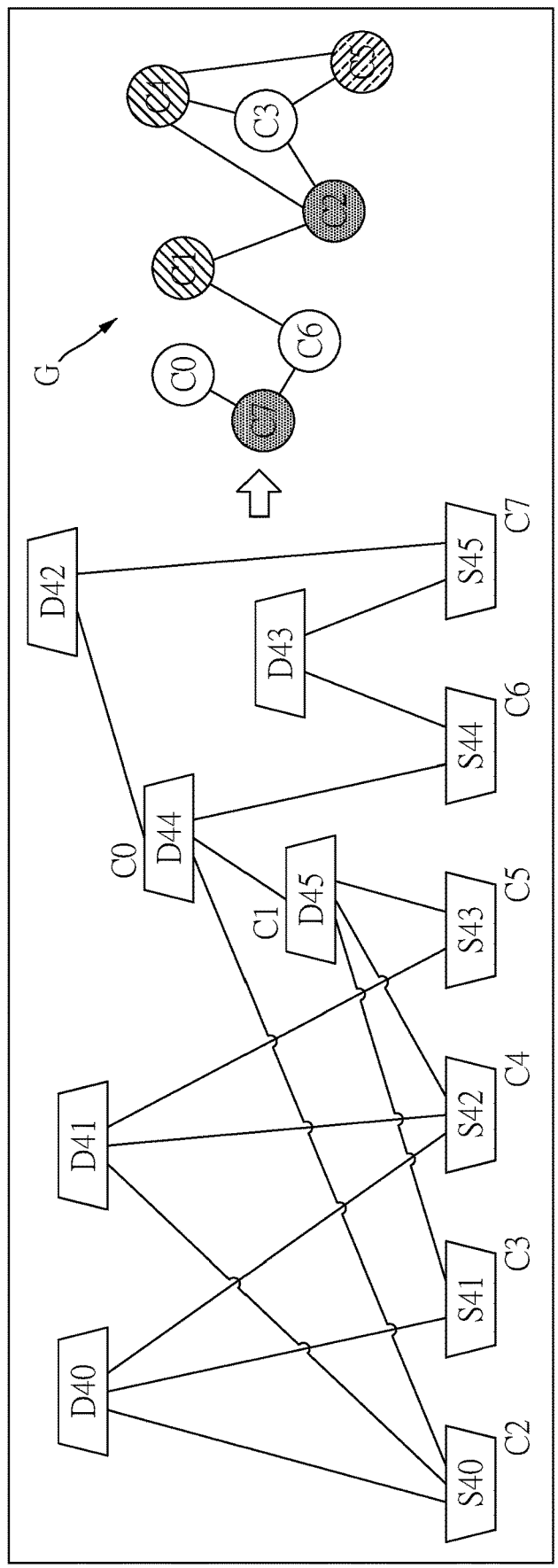
FIG. 4 is a schematic diagram showing that the bus interconnection system of FIG. 3 determines which destination nodes can reuse a same identification symbol according to a graph coloring problem (GCP)
Figure 5:
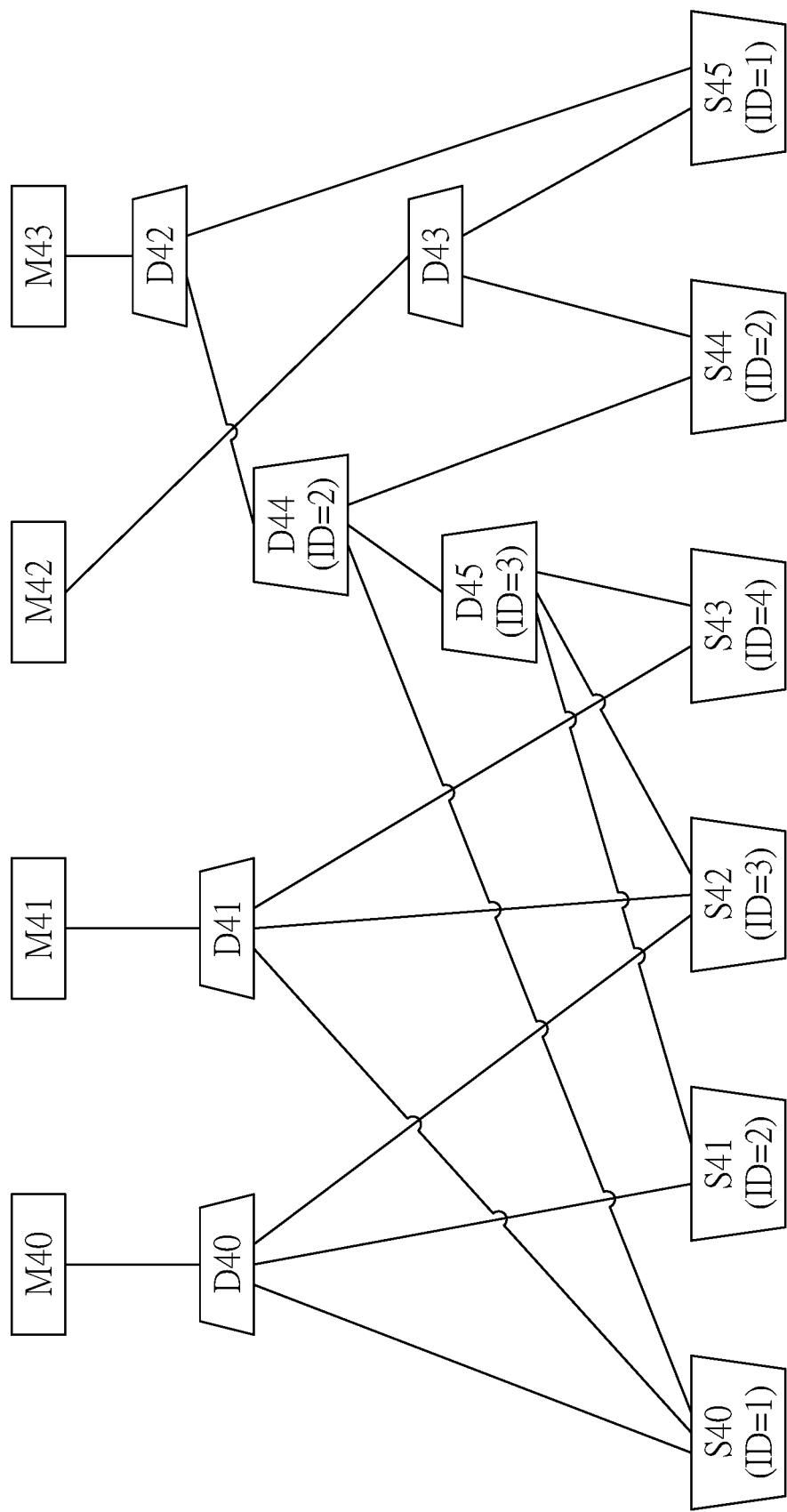
FIG. 5 is a schematic diagram showing the bus interconnection system of FIG. 3 assigning identification symbols through the GCP.

In practice, the bus interconnection system 1 can quickly find out a smallest number of identification symbols ID for use according to a graph coloring problem, in other words, the bus interconnection system 1 can determine which of the destination nodes can reuse the same identification symbol ID. As shown in FIG. 4, for the convenience of the following description, the present embodiment first denotes the switch nodes D44 and D45, and the slave nodes S40 to S45 in FIG. 3 as destination nodes C0 to C7, respectively, and the destination nodes C0 to C7 are regarded as vertices in an undirected graph G. Then, if two of the destination nodes have the same source node, the two of the destination nodes have an edge in the undirected graph G. For example, since source nodes of the destination node C0 and the destination node C7 are both the switch node D42, the destination node C0 and the destination node C7 will have edges in the undirected graph G, that is, the destination nodes C0 and the destination node C7 are connected in the undirected graph G. It should be understood that a purpose of the graph coloring problem is to mark two adjacent vertices using different colors to divide these vertices into K color groups. Therefore, the embodiment of FIG. 4 uses four colors, and one color can represent one identification symbol ID in this case. However, in order to represent different colors using black and white, FIG. 4 uses different backgrounds consisting of lines to represent different colors. In a word, if two destination nodes have the same source node, they must use different identification symbols ID. Otherwise, the same identification symbol ID can be reused. Therefore, the bus interconnection system 1 in FIG. 5 only requires to assign four different identification symbols ID, such as numbers 1 to 4, to the slave nodes S40 to S45 and the switch nodes D44 and D45, thereby achieving the goal of saving the number of bits required to set the destination identification symbols DID.

In conclusion, the bus interconnection system and the method for detecting bad routing by the same provided by the present disclosure can add destination identification symbols to the transmission format of the data complied to the standard bus protocol, and is equivalent to designing redundant data to provide the destination node to detect the bad routings. Therefore, the present disclosure reduces hardware cost, avoids unnecessary energy waste and performance loss, and improves reliability and fault tolerance. In addition, the bus interconnection system provided by the embodiments of the present disclosure can further determine which destination nodes can reuse the same identification symbol according to the graph coloring problem, so as to reduce the total number of identification symbols required, and also save the number of bits required for setting the destination identification symbols.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A bus interconnection system, comprising:
at least one master node;
a plurality of destination nodes; and
at least one first order switch node coupled between the at least one master node and the plurality of destination nodes, wherein the plurality of destination nodes include a plurality of slave nodes;
wherein an identification symbol is assigned to each of the plurality of destination nodes, and a destination identification symbol is added to data sent to the slave nodes by the at least one master node through the at least one first order switch node;
wherein, in response to the at least one first order switch node receiving the data, the at least one first order switch node updates the destination identification symbol of the data according to a payload of the data, and in response to one of the plurality of destination nodes receiving the data, the one of the plurality of destination nodes determines whether or not a bad routing occurs by checking whether or not the destination identification symbol of the data is equal to the identification symbol assigned to the one of the plurality of destination nodes that receives the data.

2. The bus interconnection system according to claim 1, wherein the at least one master control node further sets the destination identification symbol of the data as an initial symbol.

3. The bus interconnection system according to claim 1, wherein, in response to the destination identification symbol of the data being not equal to the identification symbol assigned to the destination node that receives the data, the destination node determines that the bad routing occurs.

4. The bus interconnection system according to claim 3, wherein the plurality of destination nodes further include at least one second order switch node, the at least one second order switch node is coupled between the at least one first order switch node and the plurality of slave nodes, the at least one second order switch node receives the data sent by the at least one master node through the at least one first order switch node, and sends the data to one of the plurality of slave nodes.

5. The bus interconnection system according to claim 4, wherein, in response to the at least one second order switch node receiving the data and determining that the bad routing does not occur, the at least one second order switch node then updates the destination identification symbol of the data according to the payload of the data.

6. The bus interconnection system according to claim 4, wherein, in response to the at least one second order switch node receiving the data and determining that the bad routing occurs, the at least one second order switch node then sets the destination identification symbol of the data as an error symbol, and sends the data to any one of the plurality of slave nodes.

7. The bus interconnection system according to claim 1, wherein the bus interconnection system further determines which ones of the plurality of destination nodes can reuse a same identification symbol according to a graph coloring problem.

8. A method for detecting bad routing suitable for a bus interconnection system including at least one master node, a plurality of destination nodes, and at least one first order switch node that is coupled between the at least one master node and the plurality of destination nodes, the plurality of destination nodes including a plurality of slave nodes, and the method comprising:
assigning an identification symbol to each of the plurality of destination nodes, and adding a destination identification symbol to data sent to the slave nodes by the at least one master node through the at least one first order switch node;
in response to the at least one first order switch node receiving the data, updating the destination identification symbol of the data according to a payload of the data by the at least one first order switch node; and
in response to one of the plurality of destination nodes receiving the data, determining, by the one of the plurality of destination nodes, whether or not a bad routing occurs by checking whether or not the destination identification symbol of the data is equal to the identification symbol assigned to the one of the plurality of destination nodes that receives the data.

9. The method according to claim 8, further comprising:
setting, by the at least one master control node, the destination identification symbol of the data as an initial symbol.

10. The method according to claim 8, further comprising:
in response to the destination identification symbol of the data being not equal to the identification symbol assigned to the destination node that receives the data, determining that the bad routing occurs by the destination node.

11. The method according to claim 10, wherein the plurality of destination nodes further include at least one second order switch node, the at least one second order switch node is coupled between the at least one first order switch node and the plurality of slave nodes, and the method further comprising:
receiving, by the at least one second order switch node, the data sent by the at least one master node through the at least one first order switch node; and
sending the data to one of the plurality of slave nodes by the at least one second order switch node.

12. The method according to claim 11, further comprising:
in response to the at least one second order switch node receiving the data and determining that the bad routing does not occur, updating, by the at least one second order switch node, the destination identification symbol of the data according to the payload of the data.

13. The method according to claim 11, further comprising:
- in response to the at least one second order switch node receiving the data and determining that the bad routing occurs, setting, by the at least one second order switch node, the destination identification symbol of the data as an error symbol; and
- sending the data to any one of the plurality of slave nodes by the at least one second order switch node.

14. The method according to claim 8, further comprising:
- determining, by the bus interconnection system, which ones of the plurality of destination nodes can reuse a same identification symbol according to a graph coloring problem.

\* \* \* \* \*